(12) United States Patent
Shiota et al.

(10) Patent No.: US 10,257,120 B2
(45) Date of Patent: Apr. 9, 2019

(54) CONVERTING AN AGGREGATED FLOW TO A REAL FLOW FOR CORE NODES

(71) Applicant: NEC Corporation, Minato-ku, Tokyo (JP)

(72) Inventors: Naoki Shiota, Tokyo (JP); Toshio Koide, Tokyo (JP)

(73) Assignee: NEC CORPORATION, Tokyo (JP)

( * ) Notice: Subject to any disclaimer, the term of this patent is extended or adjusted under 35 U.S.C. 154(b) by 143 days.

(21) Appl. No.: 15/324,029

(22) PCT Filed: Jul. 14, 2015

(86) PCT No.: PCT/JP2015/003552
§ 371 (c)(1),
(2) Date: Jan. 5, 2017

(87) PCT Pub. No.: WO2016/009642
PCT Pub. Date: Jan. 21, 2016

(65) Prior Publication Data
US 2017/0208020 A1 Jul. 20, 2017

(30) Foreign Application Priority Data

Jul. 16, 2014 (JP) ................................. 2014-145872

(51) Int. Cl.
*H04L 12/937* (2013.01)
*H04L 12/801* (2013.01)
*H04L 12/721* (2013.01)
*H04L 12/751* (2013.01)

(52) U.S. Cl.
CPC ............ *H04L 49/254* (2013.01); *H04L 47/18* (2013.01); *H04L 45/02* (2013.01); *H04L 45/38* (2013.01)

(58) Field of Classification Search
CPC ....... H04L 49/254; H04L 47/18; H04L 45/38; H04L 45/02
See application file for complete search history.

(56) References Cited

U.S. PATENT DOCUMENTS

| 2008/0002676 A1* | 1/2008 | Wiley ............... H04L 29/06027 370/356 |
| 2008/0153541 A1* | 6/2008 | Rakshani ................ H04B 1/40 455/552.1 |

(Continued)

FOREIGN PATENT DOCUMENTS

| JP | 2013-500654 A | 1/2013 |
| JP | 2013-211706 A | 10/2013 |
| JP | 2014-060803 A | 4/2014 |

(Continued)

OTHER PUBLICATIONS

McHugh, John P. et al., Oracle Real Application Clusters (RAC) and Oracle Clusterware Interconnect Virtual Local Area Networks (VLANs) Deployment Considerations, Jun. 2012, Oracle, URL: <http://www.oracle.com/technetwork/products/clusterware/overview/interconnect-vlan-06072012-1657506.pdf>. (Year: 2012).*

(Continued)

*Primary Examiner* — Omar J Ghowrwal

(57) ABSTRACT

A communication control apparatus according to the present invention is connected between a core node which processes received packets in accordance with a specified flow and a control apparatus which controls the core node, controls each of the core nodes existing in an aggregated network into which one or more the core nodes are aggregated, and converts an aggregated flow specified for an aggregated network and received from the control apparatus to a real flow specified for each of the core nodes in the aggregated network based on connection relationships between the core nodes in the aggregated network, information specifying a real port which is a port through which the core node in the aggregated network is connected to a device outside the aggregated network and a real node which is the core node having the real port for each the aggregated networks.

8 Claims, 17 Drawing Sheets

| AGGREGATED FLOW | | REAL FLOW | | |
|---|---|---|---|---|
| MATCH CONDITION | ACTION | RELATED NODE | MATCH CONDITION | ACTION |
| src IP = xx.xx.xx.xx<br>dst IP = yy.yy.yy.yy<br>in_port = port1 | FORWARD port2 | 1001 | src IP = xx.xx.xx.xx<br>dst IP = yy.yy.yy.yy<br>in_port = port1 | FORWARD port2 |
| | | 1002 | src IP = xx.xx.xx.xx<br>dst IP = yy.yy.yy.yy<br>in_port = port2 | FORWARD port3 |
| | | 1003 | src IP = xx.xx.xx.xx<br>dst IP = yy.yy.yy.yy<br>in_port = port1 | FORWARD port2 |
| ⋮ | | ⋮ | | |

801 / 802

(56) References Cited

U.S. PATENT DOCUMENTS

| | | | |
|---|---|---|---|
| 2012/0140637 A1 | 6/2012 | Dudkowski et al. | |
| 2013/0064243 A1 | 3/2013 | Akiyoshi | |
| 2014/0344913 A1* | 11/2014 | Stahl | H04L 12/1403 726/11 |

FOREIGN PATENT DOCUMENTS

WO        2012/108382 A1      8/2012

OTHER PUBLICATIONS

CISCO, Campus Network for High Availability Design Guide, May 21, 2008, URL: <https://www.cisco.com/c/en/us/td/docs/solutions/Enterprise/Campus/HA_campus_DG/hacampusdg.html>. (Year: 2008).*

Nick McKeown et al., "OpenFlow: Enabling Innovation in Campus Networks", Mar. 14, 2008, pp. 1-6. URL: http://www.openflow.org/documents/openflow-wp-latest.pdf.

"OpenFlow Switch Specification" Version 1.1.0 Implemented (Wire Protocol 0x02), Feb. 28, 2011, pp. 1-56. URL: http://www.openflow.org/documents/openflow-spec-v1.1.0.pdf.

Yuta Ashida, Toshio Koide, Hideyuki Shimonishi, "A hierarchical control method with domain aggregation on OpenFlow networks", IEICE technical report, vol. 112, No. 10, CQ2012-7, pp. 35-40, Apr. 2012.

International Search Report for PCT Application No. PCT/JP2015/003552, dated Aug. 11, 2015.

English translation of Written opinion for PCT Application No. PCT/JP2015/003552.

* cited by examiner

Fig. 3

| Link ID | From | | To | |
|---|---|---|---|---|
| | REAL NODE ID | REAL PORT ID | REAL NODE ID | REAL PORT ID |
| link1 | 1001 | port2 | 1002 | port2 |
| link2 | 1001 | port3 | 1004 | port3 |
| link3 | 1002 | port3 | 1003 | port1 |
| link4 | 1003 | port3 | 1004 | port1 |
| link5 | 1005 | port3 | 1006 | port1 |
| link6 | 1005 | port2 | 1008 | port2 |
| link7 | 1006 | port3 | 1007 | port1 |
| link8 | 1007 | port2 | 1008 | port1 |

Fig. 4

| REAL NODE ID | LINK ID | PORT ASSOCIATION | | |
|---|---|---|---|---|
| | | AGGREGATED PORT ID | REAL NODE ID | REAL PORT ID |
| 1001 | link1 | port1 | 1001 | port1 |
| 1002 | link2 | port2 | 1003 | port2 |
| 1003 | link3 | ⋮ | ⋮ | ⋮ |
| 1004 | link4 | | | |

Fig. 5

| AGGREGATED FLOW | | REAL FLOW | | |
| --- | --- | --- | --- | --- |
| MATCH CONDITION | ACTION | RELATED NODE | MATCH CONDITION | ACTION |
| src IP = xx.xx.xx.xx<br>dst IP = yy.yy.yy.yy<br>in_port = port1 | FORWARD port2 | 1001 | src IP = xx.xx.xx.xx<br>dst IP = yy.yy.yy.yy<br>in_port = port1 | FORWARD port2 |
| | | 1002 | src IP = xx.xx.xx.xx<br>dst IP = yy.yy.yy.yy<br>in_port = port2 | FORWARD port3 |
| | | 1003 | src IP = xx.xx.xx.xx<br>dst IP = yy.yy.yy.yy<br>in_port = port1 | FORWARD port2 |
| ⋮ | | | ⋮ | |

Fig. 6

| SYSTEM | REAL NODE ID | LINK ID | PORT ASSOCIATION | | | IN-USE |
|---|---|---|---|---|---|---|
| | | | AGGREGATED PORT ID | REAL NODE ID | REAL PORT ID | |
| A | 1001 | link1 | port1 | 1001 | port1 | O |
| | 1002 | link2 | port2 | 1003 | port2 | |
| | 1003 | link3 | ⋮ | ⋮ | ⋮ | |
| | 1004 | link4 | | | | |
| B | 1005 | link5 | port1 | 1005 | port1 | |
| | 1006 | link6 | port2 | 1007 | port3 | |
| | 1007 | link7 | ⋮ | ⋮ | ⋮ | |
| | 1008 | link8 | | | | |

Fig. 7

| FAILURE LEVEL | SYSTEM TO USE |
|---|---|
| AVOIDABLE FAILURE | A |
| UNAVOIDABLE FAILURE | B |
| NONE | A |

| SYSTEM IN USE | FAILURE LEVEL | SYSTEM TO USE |
|---|---|---|
| A | AVOIDABLE FAILURE | A |
| | UNAVOIDABLE FAILURE | B |
| | BANDWIDTH NARROWING OF NODES X AND Y | B |
| B | BANDWIDTH RECOVERY OF NODES X AND Y | A |
| A,B | NONE | A |

CONVERTING AN AGGREGATED FLOW TO A REAL FLOW FOR CORE NODES

This application is a National Stage Entry of PCT/JP2015/003552 filed on Jul. 14, 2015, which claims priority from Japanese Patent Application 2014-145872 filed on Jul. 16, 2014, the contents of all of which are incorporated herein by reference, in their entirety.

TECHNICAL FIELD

The present invention relates to a communication control apparatus, a communication system, a communication method and a communication control program for controlling a plurality of communication devices.

BACKGROUND ART

A technique called "OPENFLOW" has been proposed in recent years (see NPL 1 and NPL 2). OPENFLOW treats communication as an end-to-end flow and performs path control, failure recovery, load balancing and optimization in unit of flow.

An OPENFLOW switch defined in NPL 2 includes a secure channel for communication with an OPENFLOW controller and operates in accordance with a flow table to which additions or modifications are made as appropriate as instructed by the OPENFLOW controller. In the flow table, a set of match conditions (Match Fields) against which a packet header is matched, flow statistics information (Counters), and instructions defining processing is defined for each of flows (see section "4.1 Flow Table" in NPL 2).

For example, on receipt of a packet, from the flow table for, an OPENFLOW switch searches an entry that contains a match condition that matches the header information of the received packet (see "4.3 Match Fields" in NPL 2). When the entry that matches the received packet is found as a result of the search, the OPENFLOW switch updates flow statistics information (counters). In addition, the OPENFLOW switch performs processing (packet transmission from a specified port, flooding, discarding or the like) described in the instructions field of the entry for the received packet.

On the other hand, when the entry that matches the received packet is not found as a result of the search, the OPENFLOW switch requests the OPENFLOW controller to set an entry through a secure channel. In other words, in this case, the OPENFLOW switch sends a request to send control information (a Packet-In message) for processing the received packet to the OPENFLOW controller.

The OPENFLOW switch receives a flow entry in which processing is specified and updates the flow table. In this way, the OPENFLOW switch performs packet transfer by using an entry stored in the flow table as control information.

FIG. 18 is a diagram illustrating a typical network configuration that uses OPENFLOW. Core nodes 102 depicted in FIG. 18 correspond to OPENFLOW switches and a control apparatus 101 corresponds to an OPENFLOW controller.

The core nodes 102 are mutually interconnected via communication links 104 and edge nodes 105 are connected to some of the nodes. An edge node 105 here is the starting point of communication on the OPENFLOW network and is a communication intermediary device such as a router. Each of the core nodes 102 is connected to the control apparatus 101 through a secure channel 103, and flow settings and Packet-In messages are communicated over the secure channel 103.

Using OPENFLOW in this way enables centralized control over communications on a network by the controller. On the other hand, NPL 3 describes a method for simplifying a complicated communication network including several tens of thousands of nodes by aggregating the communication network in order to control the communication network using OPENFLOW.

FIG. 19 is a diagram illustrating a configuration of a communication network aggregated using OPENFLOW. In the example illustrated in FIG. 19, the core nodes 102 are not directly connected to a controller 201, instead an aggregation apparatus 202 is provided between both devices. The aggregation apparatus 202 converts a flow set by the control apparatus 201 and a Packet-In message notified from the core node 102, so that the control apparatus 201 can behave as if the control apparatus 201 were controlling a communication network made up of a single node.

Note that each of the core nodes 102 in the communication network illustrated in FIG. 19 is connected to the aggregation apparatus 202 through a secure channel 204. The aggregation apparatus 202 is connected to the control apparatus 201 through a secure channel 203.

FIG. 20 is a diagram illustrating a concept of an aggregated communication network. The communication network 301 illustrated in FIG. 20 includes four core nodes each of which is connected with one edge node. Aggregating the four core nodes into one core node 303 allows the aggregated communication network 302 to be considered as including one core node 303 connected to four edge nodes.

As a result of aggregating the communication network in this way, a control apparatus needs to control only one node and therefore flow settings and processing of Packet-In messages can be accomplished using simple logics.

On the other hand, it is common practice to provide redundancy to a communication network that needs to be reliable in order to enhance fault tolerance of the communication network. There are various approaches to providing redundancy for different purposes, such as node multiplexing and link multiplexing. Especially in a communication network that needs to be highly reliable and in which service outages are not allowed, two communication networks, i.e. active-system and standby system networks, are provided and switching them is used in the event of a failure so that communication can be maintained even if the scale of the failure is large.

FIG. 21 is a diagram illustrating a configuration of a communication network including two system of an active system and a standby system for providing redundancy. The communication network illustrated in FIG. 21 includes an active-system network 401 and a standby-system network 402. Each of the networks including core nodes has the same topology. An edge node 404 and an edge node 405 are connected to both of the active-system network 401 and the standby-system network 402.

In normal operation, communication between the edge nodes are performed using only the active-system network 401. In the event of a failure that affects communication in the active-system network 401, such as disconnection of a link, information concerning routing between core nodes is changed and the communication between the edge nodes is switched to the standby-system network 402. This allows communication network services to continue in the event of a failure.

PTL 1 describes a communication system in which nodes are virtualized for transferring packets. In the communication system described in PTL 1, control apparatuses virtualize a plurality of communication nodes to generate virtual nodes and set processing rules for the communication nodes managed by the control apparatuses. Each of the control apparatuses also virtualizes a domain managed by the control apparatus as a domain node included in a higher-level domain. Further, in the communication system described in PTL 1, virtualization management units of the control apparatus control a plurality of lower-level domains as a single higher-level domain node.

PTL 2 describes a communication network including a plurality of communication nodes capable of requesting setting of flows among themselves and a plurality of switches capable of controlling paths by flows. In the communication network described in PTL 2, single optimum network path is selected from a plurality of network paths.

Specifically, in the communication network described in PTL 2, a set of switches through which packets need to pass is defined, and a set of network paths in which packets are forced to pass through the switches is calculated beforehand. Then, a single network path that is optimum in terms of energy efficiency is chosen from the calculated set of network paths.

CITATION LIST

Patent Literature

[PTL 1] International Publication No. WO 2012/108382
[PTL 2] Published Japanese Translation of PCT International Publication for Patent Application No. 2013-500654

Non Patent Literature

[NPL 1] NickMcKeown and seven others, "OpenFlow: Enabling Innovation in Campus Networks", [online], [Retrieved on Sep. 18, 2013] on the Internet at <www.openflow.org/documents/openflow-wp-latest.pdf

[NPL 2] "OpenFlow Switch Specification" Version 1.1.0 Implemented (Wire Protocol 0x02), [online], [Retrieved on Sep. 18, 2013] on the Internet at <www.openflow.org/documents/openflow-spec-v1.1.0.pdf

[NPL 3] Yuta Ashida, Toshio Koide, Hideyuki Shimonishi, "A hierarchical control method with domain aggregation on OpenFlow networks", IEICE technical report, vol. 112, No. 10, CQ2012-7, pp. 35-40, April, 2012

SUMMARY OF INVENTION

Technical Problem

As described above, it is preferable to aggregate a communication network in order to simplify communication network control. On the other hand, it is desired to provide redundancy to a communication network in order to enhance the reliability of the communication network.

To aggregate a communication network, all of the nodes included in the single communication network are virtualized into a single virtual network. On the other hand, to provide redundancy to a communication network, a plurality of disconnected independent communication networks are provided and switching is made between communication networks. It is difficult to simply combine aggregation and redundancy because aggregation and redundancy differ in assumed communication network configurations.

In the communication system described in PTL 1, a path for packet transfer can be calculated in a simple manner by using a topology composed of virtualized domains. However, in the communication system described in PTL 1, because a communication path is chosen based on the topology in the communication system, it is difficult to appropriately select a network path that includes a plurality of redundant communication nodes depending on the conditions.

In the communication system described in PTL 2, because a communication path is predetermined, it is difficult to dynamically control paths in the communication network depending on conditions, such as failures.

An object of the present invention therefore is to provide a communication control apparatus, a communication system, a communication control method and a communication control program that enhance the reliability of a communication network while simplifying control for each of the communication devices in the communication network including a plurality of communication devices.

Solution to Problem

A communication control apparatus according to the present invention is connected between a core node which processes received packets in accordance with a specified flow and a control apparatus which controls the core node. The communication control apparatus controlling each of the core nodes existing in an aggregated network into which one or more the core nodes are aggregated, the communication control apparatus includes: a communication control unit which converts a notification received from the core node in the aggregated network to a notification from the aggregated network and sends the converted notification to the control apparatus, and converts a notification which is directed to the aggregated network and received from the control apparatus to a notification to each of the core nodes in the aggregated network and sends the converted notification to the core node; a topology conversion information storage unit which stores, for each of the aggregated networks, connection relationships between the core nodes in the aggregated network, and information specifying a real port which is a port through which the core node in the aggregated network is connected to a device outside the aggregated network and specifying a real node which is the core node having the real port; and a topology update unit which updates information stored in the topology conversion information storage unit for the aggregated network as a unit, wherein, the communication control unit, based on the information stored in the topology conversion information storage unit, converts an aggregated flow specified for the aggregated network and received from the control apparatus to a real flow specified for each of the core nodes in the aggregated network.

A communication system according to the present invention includes: a core node which processes received packets in accordance with a specified flow, and a communication control apparatus connected between a control apparatus which controls the core node and the core node, the communication control apparatus controlling each of the core nodes existing in an aggregated network into which one or more the core nodes are aggregated. The communication control apparatus includes: a communication control unit which converts a notification received from the core node in the aggregated network to a notification from the aggregated network and sends the converted notification to the control apparatus, and converts a notification which is directed to the aggregated network and received from the control apparatus to a notification to each the core nodes in the aggregated network and sends the converted notification to the core node; a topology conversion information storage unit which stores, for each of the aggregated networks, connection relationships between the core nodes in the aggregated network, and information specifying a real port which is a port through which the core node in the aggregated network is connected to a device outside the aggregated network and specifying a real node which is the core node having the real port; and a topology update unit which updates information stored in the topology conversion information storage unit for the aggregated network as a unit, wherein, the communication control unit, based on the information stored in the topology conversion information storage unit, converts an aggregated flow specified for the aggregated network and received from the control apparatus to a real flow specified for each of the core nodes in the aggregated network.

A communication control method according to the present invention controls each of the core nodes existing in an aggregated network into which one or more the core nodes are aggregated. The method includes: converting a notification received from the core node in the aggregated network to a notification from the aggregated network and sends the converted notification to a control apparatus, and converting a notification which is directed to the aggregated network and received from the control apparatus to a notification to each of the core nodes in the aggregated network and sends the converted notification to the core node; updating information in a topology conversion information storage unit for the aggregated network as a unit, the topology conversion information storage unit storing, for each of the aggregated networks, connection relationships between the core nodes in the aggregated network, and information specifying a real port which is a port through which the core node in the aggregated network is connected to a device outside the aggregated network and specifying a real node which is the core node having the real port; and, based on the information stored in the topology conversion information storage unit, converting an aggregated flow specified for the aggregated network and received from the control apparatus to a real flow specified for each of the core nodes in the aggregated network.

A computer readable non-transitory medium embodying a communication control program according to the present invention is a communication control program causing a computer connected between a core node which processes received packets in accordance with a specified flow and a control apparatus which controls the core node, and controlling each of the core nodes existing in an aggregated network into which one or more the core nodes are aggregated. The program causes the computer to perform a method. The method includes: converting a notification received from the core node in the aggregated network to a notification from the aggregated network and sends the converted notification to the control apparatus, and converting a notification which is directed to the aggregated network and received from the control apparatus to a notification to each of the core nodes in the aggregated network and sends the converted notification to the core node; updating information in a topology conversion information storage unit for the aggregated network as a unit, the topology conversion information storage unit storing, for each of the aggregated networks, connection relationships between the core nodes in the aggregated network, and information specifying a real port which is a port through which the core node in the aggregated network is connected to a device outside the aggregated network and specifying a real node which is the core node having the real, port; and, based on the information stored in the topology conversion information storage unit, converting an aggregated flow specified for the aggregated network and received from the control apparatus to a real flow specified for each of the core nodes in the aggregated network.

Advantageous Effects of Invention

The present invention enhances the reliability of a communication network while simplifying control for each of the communication devices in the communication network including a plurality of communication devices.

BRIEF DESCRIPTION OF DRAWINGS

FIG. 3 is a diagram illustrating an example of information held in a real-topology table.

FIG. 4 is a diagram illustrating an example of information held in a topology conversion table.

FIG. 5 is a diagram illustrating an example of information held in a flow conversion table.

FIG. 6 is a diagram illustrating an example of information held in a network configuration database.

FIG. 7 is a diagram illustrating an example of information held in a policy database.

DESCRIPTION OF EMBODIMENTS

Example embodiments of the present invention will be described below with reference to the drawings. Implementation of a communication system according to the present invention by using OPENFLOW will be described in the example embodiments.

Figure 1:
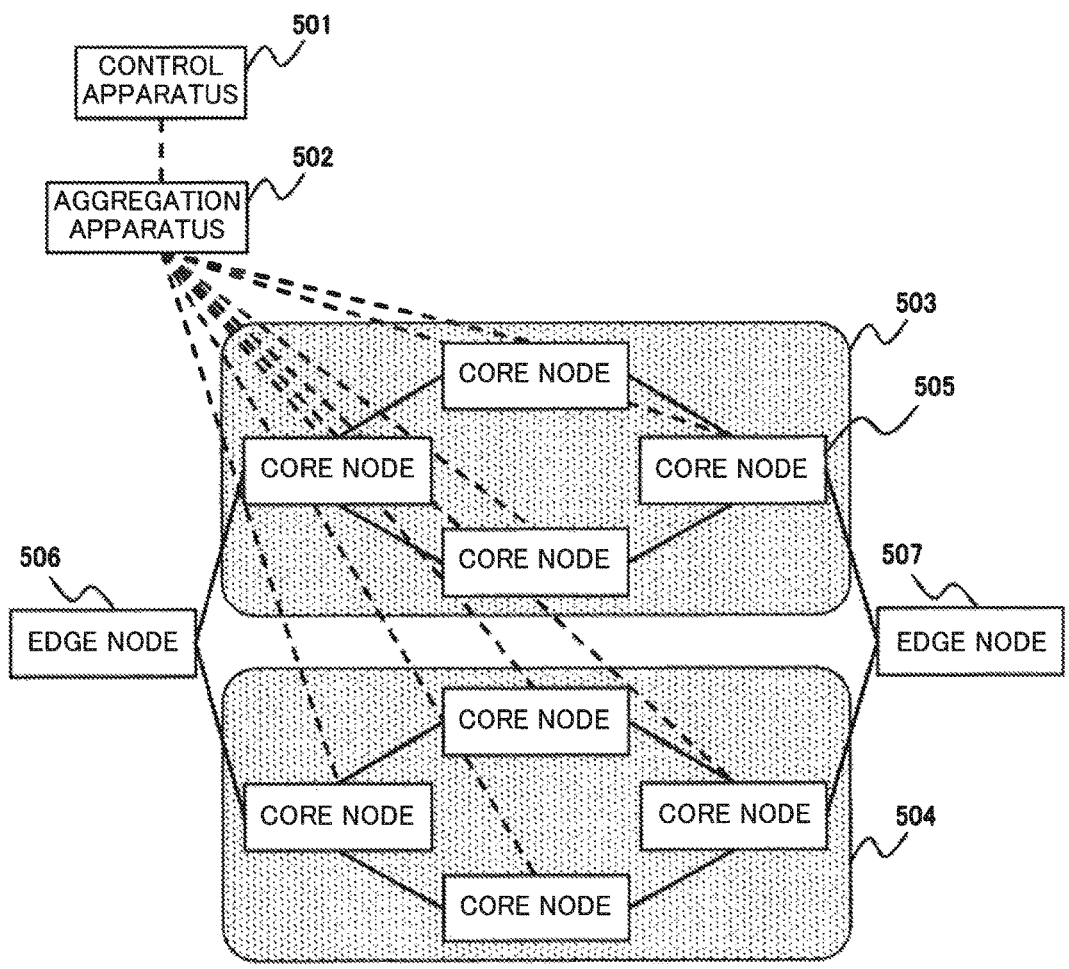
FIG. 1 is a block diagram illustrating an example embodiment of a communication system according to the present invention.

FIG. 1 is a block diagram illustrating an example embodiment of a communication system according to the present invention. The communication system illustrated in FIG. 1 includes a control apparatus 501, an aggregation apparatus 502, and core nodes 505.

The core nodes 505 are communication devices that process packets received in accordance with specified flows. The core nodes 505 are included in either an aggregated network 503 or an aggregated network 504, which will be described later, and correspond to OPENFLOW switches in OPENFLOW. The core nodes 505 are connected to the aggregation apparatus 502 through a secure channel.

The control apparatus 501 is an apparatus that controls the core nodes 505. Specifically, the control apparatus 501 is an apparatus that controls operations of the core nodes 505 by controlling an aggregated communication network, which will be described later, and correspond to an OPENFLOW controller in OPENFLOW.

The control apparatus 501 is connected to the aggregation apparatus 502 and processes Packet-In messages notified from the core nodes 505 through the aggregation apparatus 502. Further, the control apparatus 501 instructs the aggregation apparatus 502 to set a flow.

A communication network which is a control target of the control apparatus 501 is a communication network which aggregates one or more core nodes (hereinafter the communication network will be sometimes referred to as an aggregated network). In other words, the aggregated network is treated as a network including a single virtual core node.

A number of ports provided in the single virtual core node is equal to a number of ports through which the core nodes in the aggregated network are connected to devices outside the aggregated network (hereinafter the ports will be sometimes referred to as real pots). In other words, if the aggregated network is considered to be one system of the communication network, the number of ports of the only one core node included in the aggregated network is equal to the number of ports through which the communication network of the system used is connected to other devices or another communication network.

In the following description, a communication network including individual core nodes themselves in the aggregated network will be referred to as a real network. In the example illustrated in FIG. 1, there are two of the aggregated networks 503 and 504. In the present example embodiment, the aggregated network 503 is an active-system communication network and the aggregated network 504 is a standby-system communication network.

In the example illustrated in FIG. 1, the aggregated network 503 includes four core nodes 505 and is connected to an edge node 506 and an edge node 507. The aggregated network 504 has the same network topology as the aggregated network 503 and is connected to the edge node 506 and the edge node 507 in a same way as the aggregated network 503. Only one of the aggregated network 503 and the aggregated network 504 is activated.

Note that while two networks are illustrated in FIG. 1, the number of aggregated networks is not limited to two and there may be three or more aggregated networks. While four core nodes are included in each of aggregated networks illustrated in FIG. 1, there may be two or three or more than four core nodes in each of the aggregated networks.

The aggregation apparatus 502 is a device that is connected between the core nodes 505 and the control apparatus 501 and aggregates a redundant communication networks. The aggregation apparatus 502 is connected to all of the core nodes included in the aggregated network 503 or the aggregated network 504 and operates as an OPENFLOW controller in OPENFLOW. In other words, the aggregation apparatus 502 converts a Packet-In message notified from each of the core nodes 505 and notifies the converted message to the control apparatus 501.

Further, the aggregation apparatus 502 converts a flow set by the control apparatus 501 for the aggregated network 503 or the aggregated network 504 to an applicable form, and sets the flow for each of the core nodes in the aggregated network. Since the aggregation apparatus 502 controls communication by setting a flow for each the core nodes in this way, the aggregation apparatus 502 can be referred to as a communication control apparatus.

The edge nodes 506 and the edge node 507 are devices that are starting points of communications and may be edge routers, for example.

Figure 2:
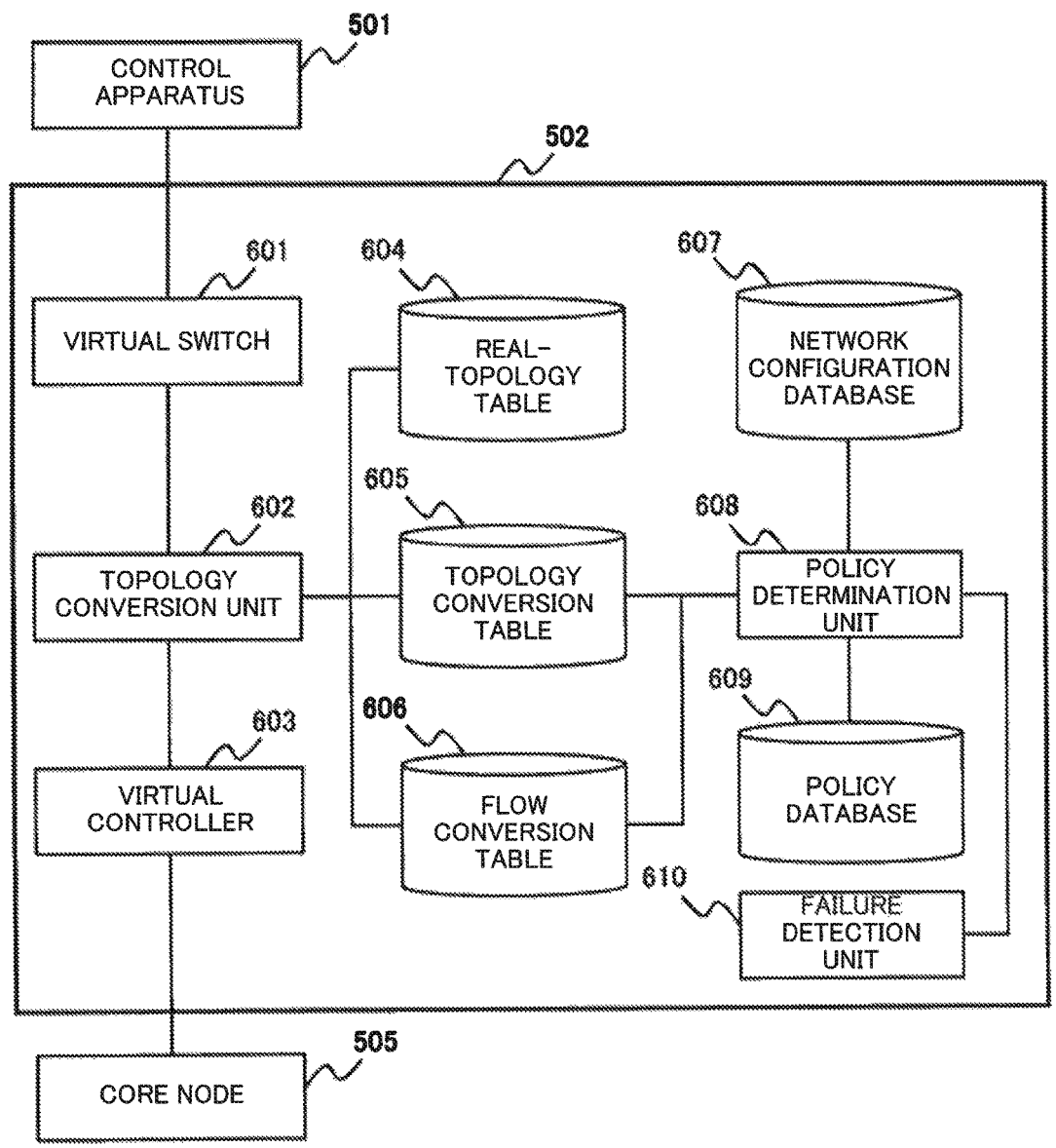
FIG. 2 is a block diagram illustrating an example configuration of an aggregation apparatus.

FIG. 2 is a block diagram illustrating an example configuration of the aggregation apparatus 502 of the present example embodiment. The aggregation apparatus 502 of the present example embodiment includes a virtual switch 601, a topology conversion unit 602, a virtual controller 603, a real-topology table 604, a topology conversion table 605, a flow conversion table 606, a network configuration database 607, a policy determination unit 608, a policy database 609, and a failure detection unit 610.

The virtual switch 601 is a virtual switch that is connected to the control apparatus 501 and operates like an OPENFLOW switch. Specifically, the virtual switch 601 receives a setting of a flow issued from the control apparatus 501 and notifies it to the topology conversion unit 602. The virtual switch 601 notifies a Packet-In message received from the topology conversion unit 602 to the control apparatus 501.

The virtual controller 603 is connected to the node 505 of the real network and operates as an OPENFLOW controller. Specifically, the virtual controller 603 receives a Packet-In message notified from the core node 505, and notifies the message to the topology conversion unit 602. The virtual controller 603 also notifies an instruction, such as a flow setting, that is directed to the core node 505 and received from the topology conversion unit 602 to a relevant core node 505.

The topology conversion unit 602 performs mutual conversion required between the real network and the aggregated network. Specifically, the topology conversion unit 602 converts a notification received from the core node 505 in the aggregated network into a notification from the aggregated network, and sends the notification to the control apparatus 501. The topology conversion unit 602 also converts a notification that is directed to the aggregated network and received from the control apparatus 501 into a notification to each of the core nodes 505 in the aggregated network, and sends the notification.

The topology conversion unit 602 of the present example embodiment mediates instructions, such as a setting of a flow and a Packet-Out sent from the virtual switch 601, directed to the core node 505 that operates as an OPENFLOW switch. Specifically, the topology conversion unit 602 converts information received from the virtual switch 601 to an instruction to the core node 505 that exists in the real network, and notifies the instruction to the virtual controller 603.

The topology conversion unit 602 of the present example embodiment also mediates a notification, such as a Packet-In message sent from the virtual controller 603, to the control apparatus 501 which operates as an OPENFLOW controller. Specifically, the topology conversion unit 602 converts information received from the virtual controller 603 to a message from the aggregated network, and notifies the message to the virtual switch 601.

The real-topology table 604 holds topology information indicating how the core nodes in the real network are connected. FIG. 3 is a diagram illustrating an example of the information held in the real-topology table 604. In the example illustrated in FIG. 3, each connection (link) between the core nodes is defined with a pair of an ID (real node ID) specifying the core node and an ID (real port ID) specifying a port on the core node. Note that the topology information held in the real-topology table 604 may be preset and may be updated as appropriate.

The topology conversion table 605 stores associations indicating which port in the aggregated network is related to which port in the real network and information about nodes and links available on the real network. Specifically, the topology conversion table 605 stores the relationship between the real port and the core node 505 that includes the real port (herein after such the core node 505 will be sometimes referred to as a real node) for each of the aggregated networks.

FIG. 4 is a diagram illustrating an example of the information held in the topology conversion table 605. The topology conversion table 605 holds information indicating core nodes and links included in the aggregated network. In the example illustrated in FIG. 4, the topology conversion table 605 holds IDs (real node Ids) specifying the core nodes in the real network and IDs (link IDs) for specifying links.

The topology conversion table 605 also holds the core node of the real network that is related to a port in the aggregated network and a port of the core node in association with one another. In the example illustrated in FIG. 4, the topology conversion table 605 holds the core node ID of the real network associated with the port ID specifying the port of the core node to a port ID (aggregated port ID) of the aggregated network.

Note that among the ports of the real network, there are ports that are connected to an edge node and ports that are used for connections between core nodes. The port of the real network related to the port of the aggregated network is a port connected to the edge node.

When information as described above is defined, the topology conversion unit 602 performs a process for mutually converting an aggregated flow and real flows based on the information held in the flow conversion table 606.

The flow conversion table 606 holds information in which a flow in the aggregated network is associated with flows in the real network for converting the flow in the aggregated network to the flows in the real network. Specifically, the flow conversion table 606 holds a flow specified for each of the aggregated networks (hereinafter referred to as an aggregated flow) and flows specified for each of the core nodes in the aggregated network (hereinafter referred to as real flows) in association with each other to permit the flow and the flows to be mutually converted.

FIG. 5 is a diagram illustrating an example of the information stored in the flow conversion table 606. In the example illustrated in FIG. 5, the flow conversion table 606 holds information 801 indicating the aggregated flow and information 802 indicating the real flows in association with each other. Note that because a plurality of real flows to a plurality of core nodes are related to one aggregated flow, the related core nodes are also held in the information 802 indicating the real flows.

The flow information includes narrow-down information (match conditions) for a packet received by the core node and information indicating what kind of operation (action) to be performed on the packet.

The aggregated flow example illustrated in FIG. 5 indicates that a flow is set in which a packet is sent (FORWARD) from a port with the port number "port 2" when the starting point IP address is "xx.xx.xx.xx" and the endpoint IP address is "yy.yy.yy.yy", and the number of the port receiving the packet is "port 1". Real flows to three core nodes are related to this aggregated flow, and the flow conversion table 606 holds appropriate match conditions and actions in association with each other so that the aggregated flow can be reproduced on the aggregated network. Note that the number of real flows associated is not limited to three and may be two or more than three.

The network configuration database 607 holds, for each system of the network (i.e. for each of the aggregated networks), information indicating which nodes and links on the real network are to be used for communication.

FIG. 6 is a diagram illustrating an example of the information held in the network configuration database 607. In the example illustrated in FIG. 6, information for two systems (aggregated networks) A, B are set. Further, in the example illustrated in FIG. 6, the network configuration database 607 holds information about each of the aggregated networks (systems) stored in the topology conversion table 605 and a flag indicating whether or not each system is in use ("IN-USE" flag in FIG. 6) in association with each other. The flag indicates that the set system is currently active. Note that the system is also set in the topology conversion table 605.

The policy database 609 holds a policy that defines the aggregated network to be used depending on a detected event. Specifically, the policy database 609 holds an association table indicating which network system is to be used in the event of a failure on the real network.

FIG. 7 is a diagram illustrating an example of the information held in the policy database 609. The example illustrated in FIG. 7 illustrates a policy to determine which of aggregated networks (systems) A and B is to be used. Specifically, FIG. 7 illustrates a policy that uses system A when no failure has occurred or when an avoidable failure occurs by re-setting a flow or the like, and switches to system B when unavoidable failure occurs by a failure at the core node.

The failure detection unit 610 detects a failure occurring on the real network and notifies the policy determination unit 608 of the failure. The failure detection unit 610 may detect a failure by monitoring the status of each of the core nodes and its port by using SNMP (Simple Network Management Protocol), for example. Note that the failure detection unit 610 may detect a failure on the real network by using any of other known methods for detecting failures on a network.

The policy determination unit 608 determines which aggregated network system to use based on the policy held in the policy database 609. The policy determination unit 608 then modifies the topology configuration in accordance with the determination. In other words, the policy determination unit 608 switches the core nodes used for unit of the aggregated network by updating contents of the topology conversion table 605 based on the determination.

Specifically, the policy determination unit 608 receives a notification of a failure from the failure detection unit 610, and determines the level of the failure from the contents of the notification. The policy determination unit 608 refers to the policy database 609 based on the determined level to determine which network system is to be used. Then the policy determination unit 608 refers to the network configuration database 607, retrieves the core nodes and the links included in the system (aggregated network) that the policy determination unit 608 determines to use, and writes the information about the core nodes and the links in the topology conversion table 605.

Since it is possible to switch the topologies of the real network related to the aggregated network with updating the topology information by the polity determination unit 608 in this way, the reliability of the communication network can be enhanced and control for the core nodes can be simplified.

The virtual switch 601, the topology conversion unit 602, the virtual controller 603, the policy determination unit 608, and the failure detection unit 610 are implemented by a CPU of a computer that operates in accordance with a program (communication control program). For example, the program may be stored in a storage unit (not depicted) of the aggregation apparatus 502, the CPU may read the program and operate as the virtual switch 601, the topology conversion unit 602, the virtual controller 603, the policy determination unit 608, and the failure detection unit 610 in accordance with the program.

Alternatively, the virtual switch 601, the topology conversion unit 602, the virtual controller 603, the policy determination unit 608, and the failure detection unit 610 may be implemented by dedicated pieces of hardware.

The real-topology table 604, the topology conversion table 605, the flow conversion table 606, the network configuration database 607, and the policy database 609 are stored in a storage unit (not depicted) of the aggregation apparatus 502. The storage unit is implemented by a storage device such as a magnetic disk, for example. The real-topology table 604, the topology conversion table 605, the flow conversion table 606, and the network configuration database 607 may be stored in different storage units respectively, or may be stored in separated regions in the same storage unit.

Figure 8:
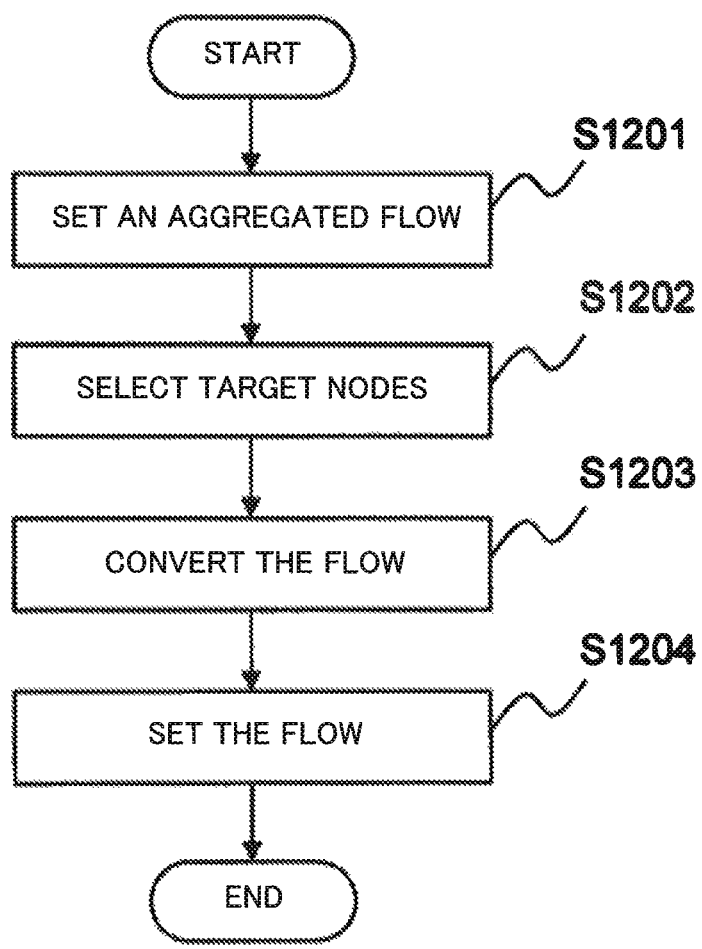
FIG. 8 is a flowchart illustrating an example operation of the aggregation apparatus.

An operation of the communication system of the present example embodiment will be described next. FIG. 8 is a flowchart illustrating an example operation of the aggregation apparatus 502 of the present example embodiment. FIG. 8 illustrates a process in which the control apparatus 501 sets a flow in the aggregation apparatus 502 and the aggregation apparatus 502 sets the flow to each of the core nodes 505.

It is assumed in the following description that the information illustrated in FIG. 4 is held in the topology conversion table 605. It is also assumed that the information illustrated in FIG. 3 is held in the real-topology table 604 as initial values. It is also assumed that no information is set in the flow conversion table 606.

It is also assumed that the aggregated network 503 corresponds the system A network and the aggregated network 504 corresponds to the system B network. It is assumed that the system A is an active-system communication network and the system B is a standby-system network. It is assumed here that the topology information of the system A, which is the active system, is set in the topology conversion table 605 as initial values at first. Note that, in general, the initial values for any one of the systems in the network configuration database 607 are set in the topology conversion table 605.

Figure 9:
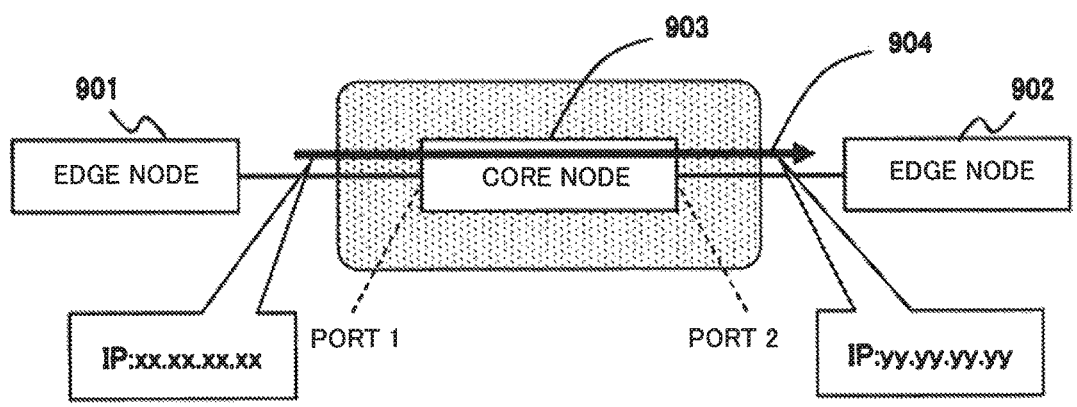
FIG. 9 is a diagram illustrating an example of a set flow.

First, the control apparatus 501 notifies a setting of a flow (aggregated flow) to the virtual switch 601 of the aggregation apparatus 502 (step S1201). FIG. 9 is a diagram illustrating an example of the set flow. The example in FIG. 9 illustrates a notification that sets in a core node 903 a contents that is "to output from port 2" in a case of "a packet having the starting point ID address xx.xx.xx.xx. and the endpoint IP address yy.yy.yy.yy. is received at port 1". Note that the core node 903 illustrated in FIG. 9 is an aggregated virtual core node.

The virtual switch 601 notifies the received flow to the topology conversion unit 602. The topology conversion unit 602 selects core nodes which are targets to be set the flow on the real network (step S1202). In other words, the topology conversion unit 602 specifies the target core nodes for which the aggregated flow is to be converted to the real flows.

It is assumed here that a match condition and an action which are illustrated in the information 801 of the aggregated flow illustrated in FIG. 5 is notified from the control apparatus 501. In this case, since in_port and a FORWARD destination port to be set in the aggregated core node are determined, the topology conversion unit 602 first searches for ports on the real network that are related to the respective ports. Specifically, the topology conversion unit 602 refers to the topology conversion table 605 to identify related nodes and ports.

Then, the topology conversion unit 602 searches a path that links the identified pots based on the connection relationships between the core nodes in the aggregated network by referring the real-topology table 604. There are various search methods, such as path minimization or capacity maximization, as a search criteria. The topology conversion unit 602 may use any criteria and method to search the path.

Figure 10:
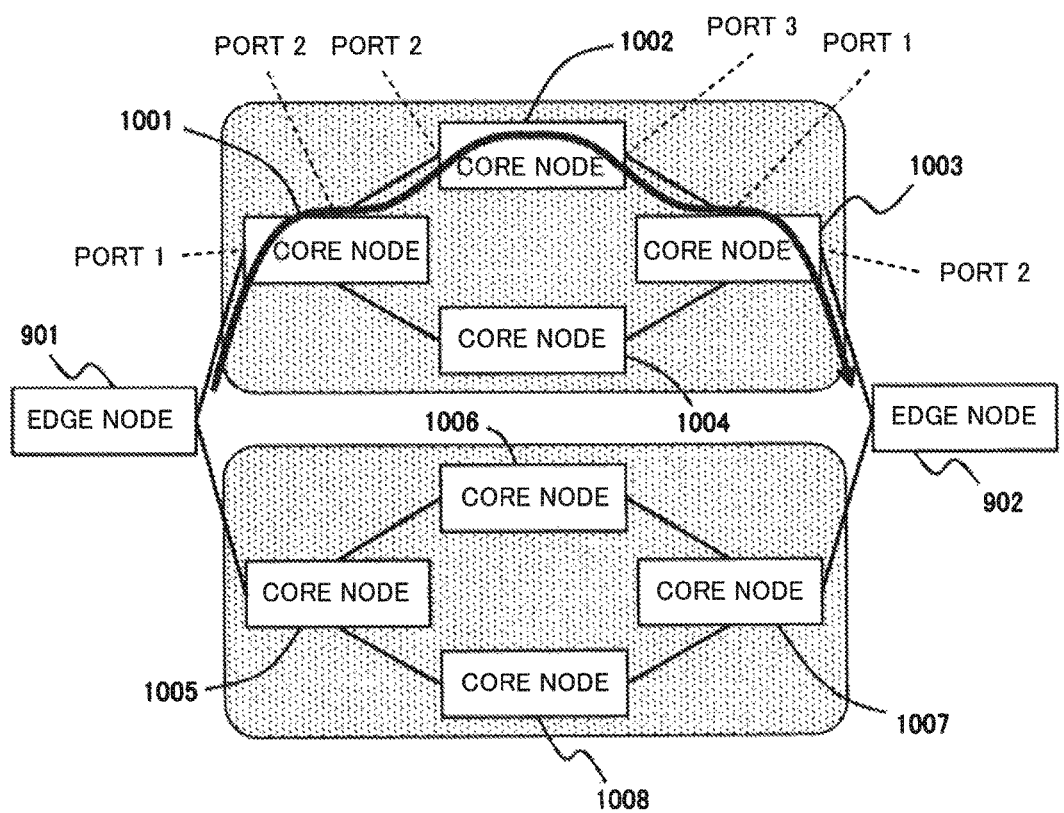
FIG. 10 is a diagram illustrating a found path.

FIG. 10 is a diagram illustrating an example of a found path. For example, it is assumed that the path indicated by the thick arrow in FIG. 10 is found by shortest path search. In this case, since only links that are included in the active-system aggregated network 503 are set in the real-topology table 604, the founded path as the shortest path is only the path through links included in the aggregated network 503.

When the path is identified, the topology conversion unit 602 sets a flow for the nodes on the path. At that time, the topology conversion unit 602 converts the aggregated flow into the real flows in accordance with the calculated communication path (step S1203). In the example illustrated in FIG. 10, the target nodes are three nodes: a core node 1001, a core node 1002, and a core node 1003. Because an input port and an output port of each core node can be determined once the path is identified, the topology conversion unit 602 can break up the aggregated flow into the real nodes to be set to the core nodes based on the relationships between the ports. In this way, the real flows illustrated in FIG. 5 are calculated.

The topology conversion unit 602 notifies the calculated flows to the virtual controller 603, and the calculated flows are set in the target core nodes (step S1204).

Figure 11:
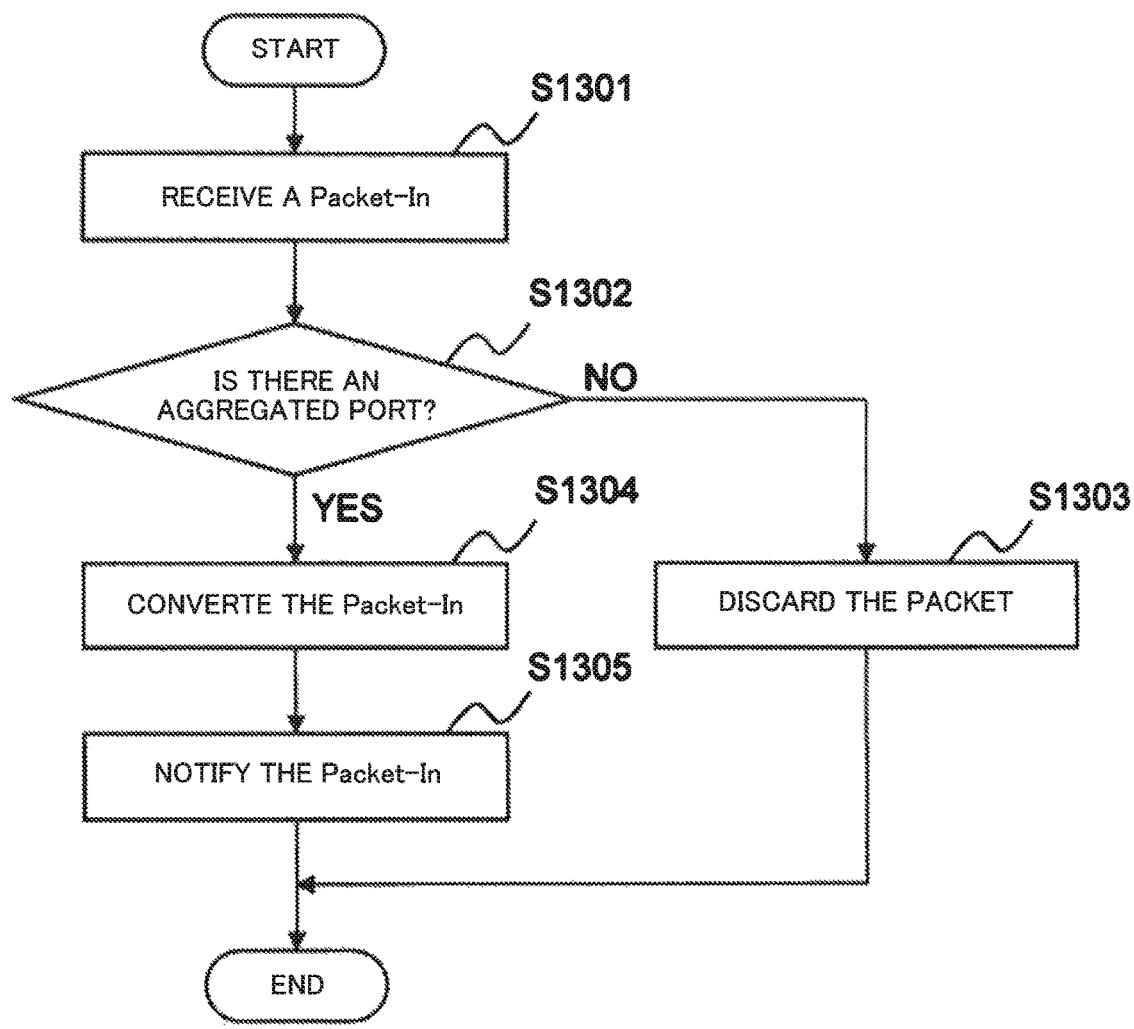
FIG. 11 is a flowchart illustrating another example operation of the aggregation apparatus.

Next, a process for notifying a Packet-In message received by the core nodes of the real network to the control apparatus 501 will be described next. FIG. 11 is a flowchart illustrating another example operation of the aggregation apparatus 502 of the present example embodiment.

When the virtual controller 603 receives a Packet-In message from the core node, the virtual controller 603 notifies the message to the topology conversion unit 602 (step S1301).

The topology conversion unit 602 specifies a related aggregated port based on the ID of the core node that sends the Packet-In message and a port number contained in the Packet-In message by referring the topology conversion table 605 (step S1302). When there is not a related aggregated port (NO at step S1302), the topology conversion unit 602 discards the Packet-in message without notifying the control apparatus 501 (step S1303).

On the other hand, when there is a related aggregated port (YES at step S1302), the topology conversion unit 602 converts the port number in the Packet-In message (step S1304). Specifically, because the Packet-In message contains the port number of the port which receives the packet, the topology conversion unit 602 performs processing for replacing a port number at the core node in the real network with a port number at the core node of the aggregated network.

The topology conversion unit 602 notifies the Packet-In message in which the port number is replaced to the control apparatus 501 through the virtual switch 601 (step S1305).

By the topology conversion unit 602 performing the process illustrates in FIG. 8 and the process illustrated in FIG. 11 in this way, a Packet-In message that occurs on the real network can be converted into a Packet-In message as if it is a Packet-In message that occurs on the aggregated network.

Furthermore, since the topology conversion unit 602 breaks up the flow (aggregated flow) set in the aggregated network into the real flows in accordance with the real network topology at the time, the flows can be set in appropriate core nodes. Accordingly, the control apparatus 501 can control communications on the network without regard to the complex real network.

Figure 12:
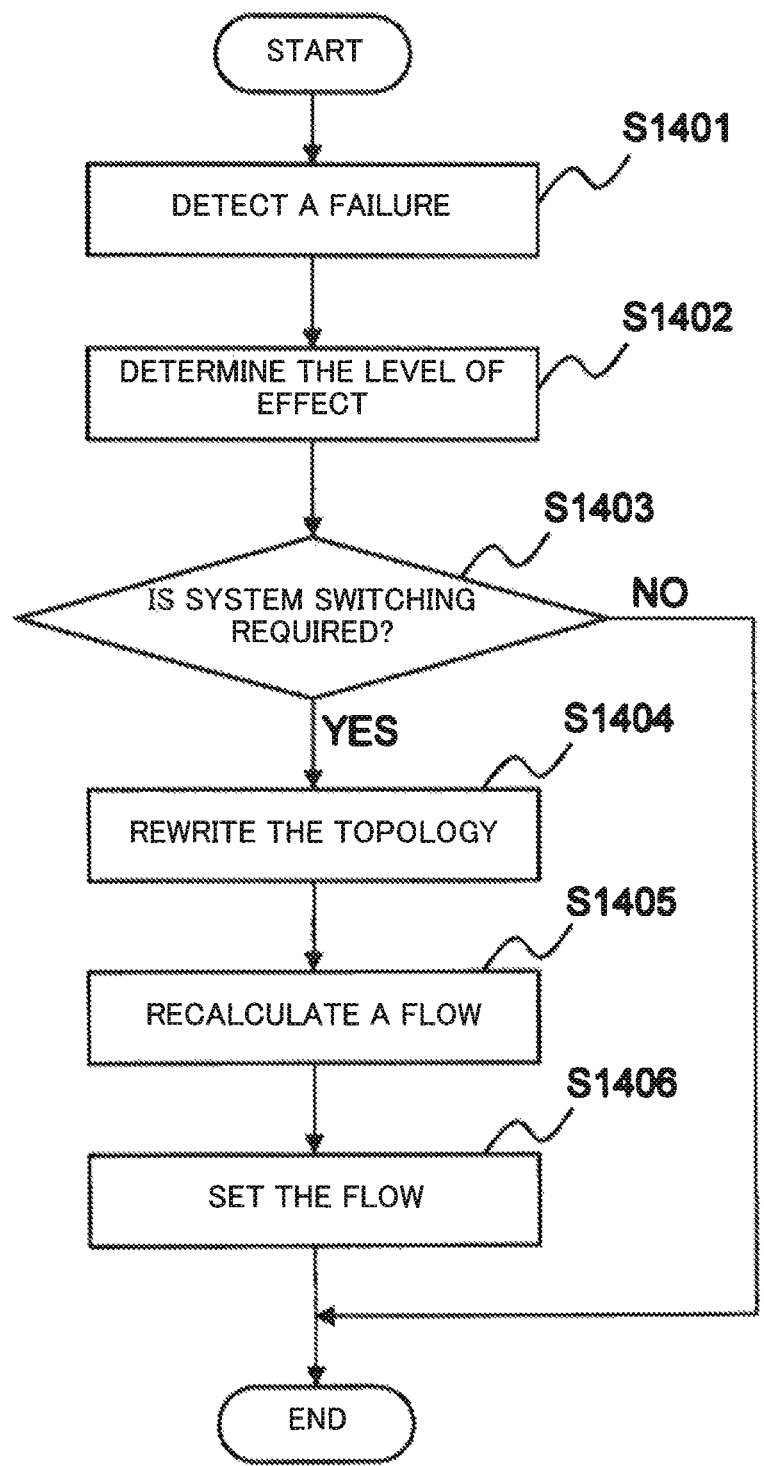
FIG. 12 is a diagram illustrating an example process for switching between aggregated networks.
Figure 13:
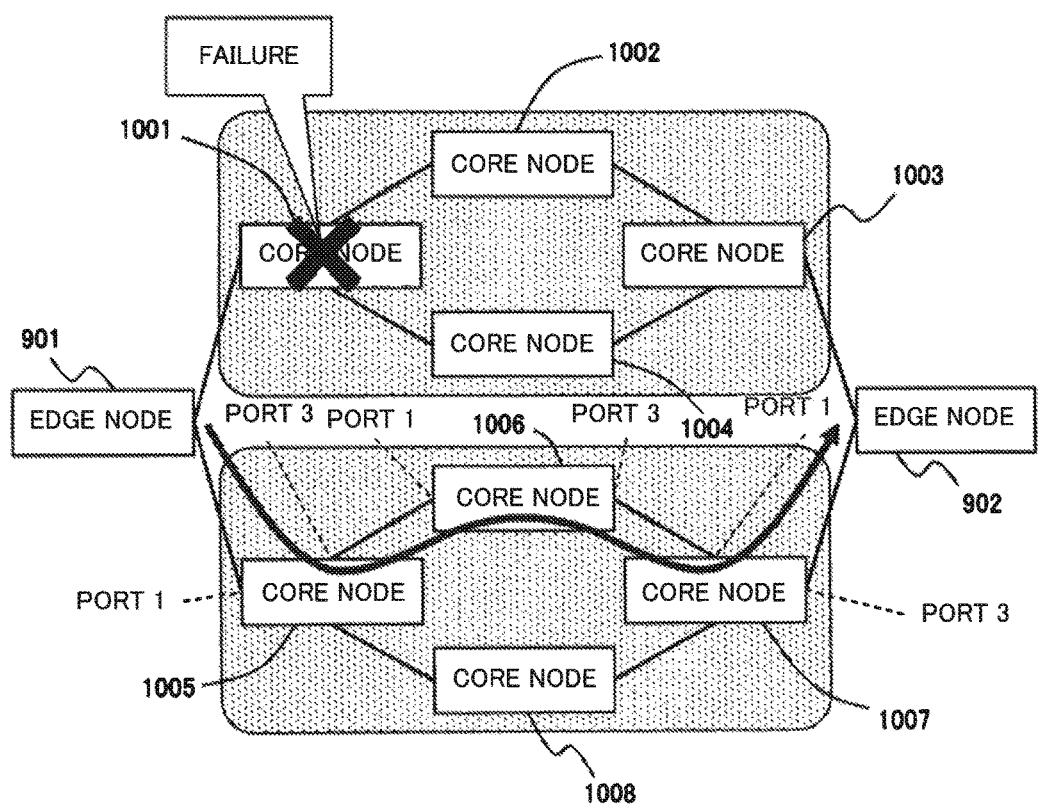
FIG. 13 is a diagram illustrating an example operation performed in the event of a failure.

A process for switching the aggregated networks in the event of a failure on the real network will be described next. FIG. 12 is a diagram illustrating an example of a process for switching the aggregated networks. FIG. 13 is a diagram illustrating an example operation performed when a failure occurs from the state illustrated in FIG. 10. Switching the aggregated networks is made by switching a topology to use.

When a failure occurs on the real network, the failure detection unit 610 detects the failure (step S1401). It is assumed here that a failure occurs on the core node 1001 depicted in FIG. 10 and the core node 1001 becomes unusable. The failure detection unit 610 notifies the contents about the failure to the policy determination unit 608.

Based on the received contents about the failure, the policy determination unit 608 determines the level of effect of the failure (step S1402). In this case, the policy determination unit 608 determines the effect of the failure from information indicating that the core node 1001 becomes unusable by referring the flow conversion table 606. In the example illustrated in FIG. 5, the aggregated flow becomes unfeasible due to the failure in the core node 1001. As there is such an unfeasible aggregated flow, the policy determination unit 608 attempts to recalculates a path for the aggregated flow.

As illustrated in FIG. 13, when a failure occurs on the core node 1001 of the aggregated network 503, a route cannot be re-set. The policy determination unit 608 therefore determines the level of the failure to be an "unavoidable failure". Note that when a route can be re-set, the policy determination unit 608 determines the level of the failure to be an "avoidable failure".

The policy determination unit 608 determines switching destination of a system (aggregated network) by referring the network configuration database 607 and the policy database 609 (step S1403). When the systems are the same before and after determination, i.e. when system switching systems is not required (NO at step S1403), the policy determination unit 608 ends the process without doing anything.

For example, when the policy illustrated in FIG. 7 is set in the policy database 609, the policy determination unit 608 specifies system B that is a switching destination related to "unavoidable failure" determined in step S1402. Alternatively, for example, when the current system is set as in the network configuration database 607 illustrated in FIG. 6, the policy determination unit 608 specifies the current system A by referring the network configuration database 607. In this case, the policy determination unit 608 determines that switching from the current system A to system B is required.

When system switching is required (YES at step 1403), the policy determination unit 608 rewrites the topology conversion table 605 (step 1404). In the example described above, the switching destination is system B. Accordingly, the policy determination unit 608 writes an association list of real node IDs, link IDs, and ports included in system B illustrated in FIG. 6 into the topology conversion table 605. Additionally, the policy determination unit 608 deletes the in-use flag set for system A from the network configuration database 607 and sets the in-use flag for system B.

When detecting a rewriting of the topology conversion table 605, the policy determination unit 608 re-calculates a flow to be set in the flow conversion table 606 (step S1405). Specifically, the policy determination unit 608 deletes all parts of the real flow information set in the flow conversion table 606. The policy determination unit 608 then performs processing similar to the processing performed at steps S1202 and S1203 illustrated in FIG. 8.

In this way, when the policy determination unit 608 updates the information held in the topology conversion table 605, the policy determination unit 608 recalculates the real flows related to the aggregated flow and updates the real flows related to the aggregated flow held in the flow conversion table 606.

The policy determination unit 608 sets the flow to the core nodes of the real network in accordance with the contents in the reconfigured flow conversion table 606 (step S1406). This processing is similar to the processing in step S1204 illustrated in FIG. 8.

Since the policy determination unit 608 updates the topology conversion table 605 and the flow conversion table 606 in this way, the control apparatus 501 can continue network control before and after occurrence of a failure without regard to the failure occurring in the real network.

As described above, in the present example embodiment, the topology conversion unit 602 converts the notification from the core node in the aggregated network to the control apparatus and the notification from the control apparatus to the aggregated network respectively. Furthermore, the topology conversion table 605 holds the connection relationships between the core nodes in the aggregated network, the real ports, and the real nodes for each of the aggregated networks, and the policy determination unit 608 updates the information held in the topology conversion table 605 for each of the aggregated networks as a unit. Then, based on the information held in the topology conversion table 605, the topology conversion unit 602 converts the aggregated flow into the real flows which are specified for each of the core nodes in the aggregated network.

Consequently, in the communication network including a plurality of communication devices, the reliability of the communication network can be enhanced while simplifying control of the communication devices in the communication network. Accordingly, reducing failures can be achieved without impairing aggregation of the communication network.

In other words, in the communication system of the present example embodiment, the topology conversion table 605 and the flow conversion table 606 are provided in the aggregation apparatus 502, and the policy determination unit 608 rewrites the conversion tables when detecting a network failure. Additionally, contents written in the topology conversion table 605 is changed in accordance with the contents in the policy database 609 and the network configuration database 607.

Specifically, the policy determination unit 608 rewrites the contents in the topology conversion table 605 and the flow conversion table 606, which are referred to by when converting information between the aggregated communication network and the real communication network, in accordance with the system currently being used. Consequently, aggregation can be achieved while providing redundancy to the communication network using the multisystem configuration.

Furthermore, in the communication system of the present example embodiment, association between the aggregated communication network and the real communication network is provided by the network configuration database 607, so that a network configuration can be set without constraints other than port associations. Accordingly, a redundant configuration of the communication network can be flexibly set.

Furthermore, in a conventional communication system, when To build a redundant network is builder with assuming large-scale failures, a plurality of networks that have the same topology need to be provided for full-scale network switching and there are various constraints on the configurations. However, in the present example embodiment, such constraints can be reduced because it is possible to switch the aggregated networks by updating the contents in the topology conversion table 605.

Next, a variation of the communication system of the present example embodiment will be described. In the example embodiment described above, the case of redundancy of communication network is illustrated, and a method of switching between two network systems having the same topology as illustrated in FIG. 1 is described. In a communication system according to the present invention, the configuration of nodes of the real network included in the aggregated network is determined by contents set in the network configuration database 607. Accordingly, a redundant configuration can be more flexibly defined.

Figures 14, 15:
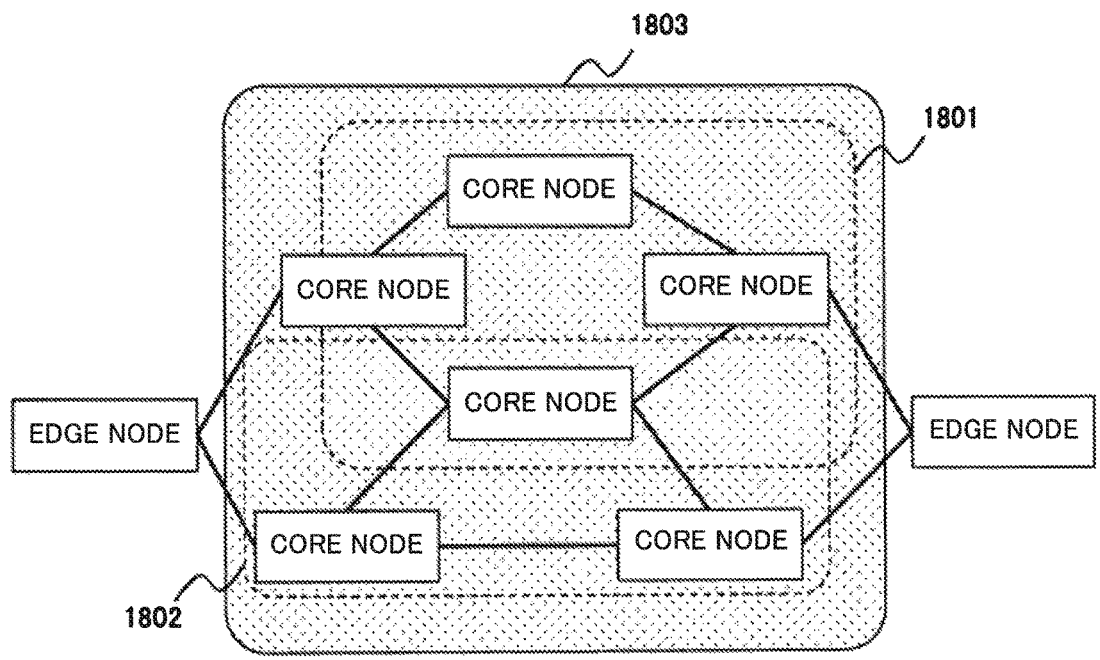
FIG. 14 is a diagram illustrating an example of a redundant network including a multisystem asymmetric node configuration.
FIG. 15 is a diagram illustrating another example of information held in the policy database.

FIG. 14 is a diagram illustrating an example of a redundant network including a multisystem asymmetric node configuration. In the example illustrated in FIG. 14, a real network includes six core nodes, and an aggregated system network 1801 including four core nodes, an aggregated system network 1802 including three core nodes, and an aggregated system network 1803 including six core nodes are defined.

In this way, the aggregated networks (systems) illustrated in FIG. 14 have different numbers of nodes and different topologies, and there are core nodes that belong to a plurality of the aggregated networks (systems). However, any configuration may be employed that includes links from each of the aggregated networks to all edge nodes. In other words, an aggregated network which links all edge nodes by combining the core nodes should be configured. Since the configuration of the real network is hidden by the topology conversion unit 602, the aggregated network (system) that satisfies the conditions described above does not affect the aggregated networks that can be seen from the control apparatus 501.

Further, even though failure levels set in the policy database 609 are only two kinds of the "avoidable failure" and the "unavoidable failure" in the example embodiment described above, the kinds of failures are not limited to the two kinds. Even though the systems to use depending on the failure levels are defined in the example embodiment described above, information for determining systems to use is not limited to the failure level.

FIG. 15 is a diagram illustrating another example of the information held in the policy database 609. The example in FIG. 15 illustrates a policy for determining a system to use depending on the system currently being used and a failure level.

In the example illustrated in FIG. 15, for example, when a failure level is found to be "bandwidth narrowing of node X and node Y", the system to use can be changed to system A or system B depending on the system currently being used. Refining conditions for system switching in this way enables more detailed control.

Further, more specific events can be set as failure levels. For example, a phenomenon, "the usage rate of a communication band between a certain edge node and another edge node rapidly increases", may be set to the failure level in the policy database 609. In this case, for example, if "system A" is set to and associated with the system currently being used and "system B" is set to and associated with the system to use, it is possible to temporary switch to system B, which has a sufficient bandwidth capacity for the path, when the above phenomenon is detected in system A. This can prevent service outages.

Note that, in this case, it is easily possible to control "returning to the original system when the usage rate becomes normal again". For example, "system B" may be set to the system currently being used, "system A" may be set to the system to use, and an phenomenon, "the usage rate of the communication band between a certain edge node and another edge node returns to a normal value (bandwidth recovery)", may be set to the failure level in the policy database 609.

In this way, the policy determination unit 608 performs processing for switching systems based on the policy set in the policy database 609. Accordingly, a communication network having a redundant configuration can be used not only for merely avoiding a network failure but also for guaranteeing service quality and enhancing the efficiency of network use.

Figure 16:
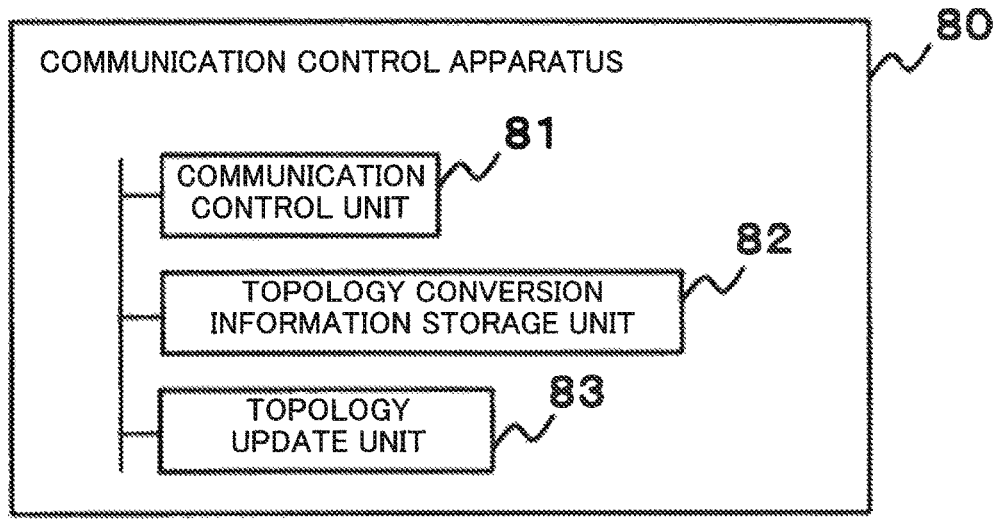
FIG. 16 is a block diagram illustrating an overview of a communication control apparatus according to the present invention.

Next, an overview of the present invention will be given. FIG. 16 is a block diagram illustrating an overview of a communication control apparatus according to the present invention. The communication control apparatus 80 (for example, the aggregation apparatus 502) according to the present invention is connected between a core node (for example, the core node 505) which processes received packets in accordance with specified flows and a control apparatus (for example, the control apparatus 501) which controls the core nodes, and controls each of the core nodes existing in an aggregated network (for example, the aggregated networks 503, 504) into which one or more core nodes are aggregated.

The communication control apparatus includes: a communication control unit 81 (for example, the topology conversion unit 602) which converts a notification (for example, the Packet-In message) received from a core node in an aggregated network to a notification from the aggregated network to send the notification to the control apparatus, and converts a notification (for example, the aggregated flow) directed to the aggregated network and received from the control apparatus to a notification (for example, the real flow) to each of the core nodes in the aggregated network to send the notification to the core node; a topology conversion information storage unit 82 (for example, the real-topology table 604, the topology conversion table 605) which stores, for each of the aggregated networks, connection relationships (for example, the link information) between the core nodes in the aggregated network and information (for example, the real node IDs, the link IDs) specifying real ports which are ports connecting the core nodes in the aggregated network to devices outside the aggregated network and real nodes which are the core nodes that have the real pots; and a topology update unit 83 (for example, the policy determination unit 608) which updates the information stored in the topology conversion information storage unit 82 for each of the aggregated networks as a unit.

Based on the information stored in the topology conversion information storage unit 82, the communication control apparatus 81 converts an aggregated flow which is specified for each of the aggregated networks and received from the control apparatus to a real flow which is specified for each of the core nodes in the aggregated network.

The configuration as described above enhances the reliability of a communication network while simplifying control over the communication devices in the communication network including a plurality of communication devices.

The communication control apparatus may further include a policy storage unit (for example, the policy database 609) which stores policies defining the aggregated network to be used depending on a detected event (for example, the failure level). Based on a policy, the topology update unit 83 may update the information stored in the topology conversion information storage unit 82 with the information indicating the aggregated network related to the detected event. Such a configuration enables to flexibly switch the communication networks depending on an event.

Further, the communication control unit 82 may calculate a communication path based on connection relationships between the core nodes in the aggregated network (for example, by using shortest path search), and may convert the aggregated flow to the real flows in accordance with the calculated communication path. In this way, it is possible to dynamically determine the communication path in the aggregated network.

The communication control apparatus may further include a flow conversion information storage unit (for example, the flow conversion table 606) which stores the aggregated flows and the real flows which are mutually converted in association with one another. The communication control unit 81 may mutually convert the aggregated flow and the real flows based on the information stored in the flow conversion information storage unit.

Further, when updating the information stored in the topology conversion information storage unit, the topology update unit 83 may recalculate the real flows related to the aggregated flow and may update the real flows related to the aggregated flow stored in the flow conversion information storage unit. In this way, it is possible to immediately reflect switching the aggregated network to communication control.

Figure 17:
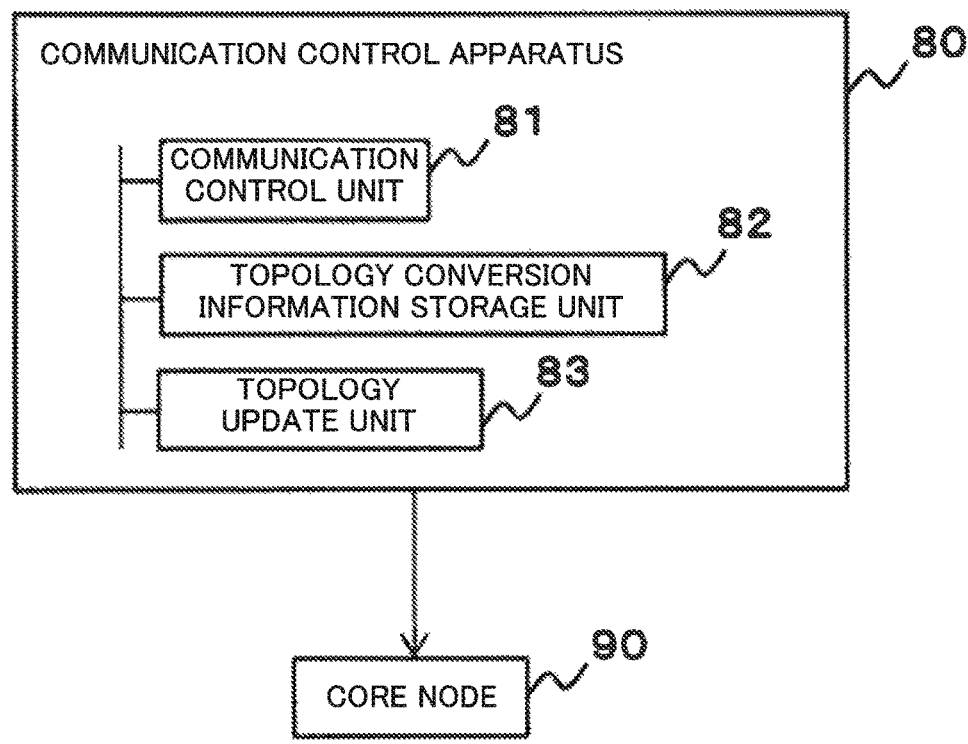
FIG. 17 is a block diagram illustrating an overview of a communication system according to the present invention.
Figure 18:
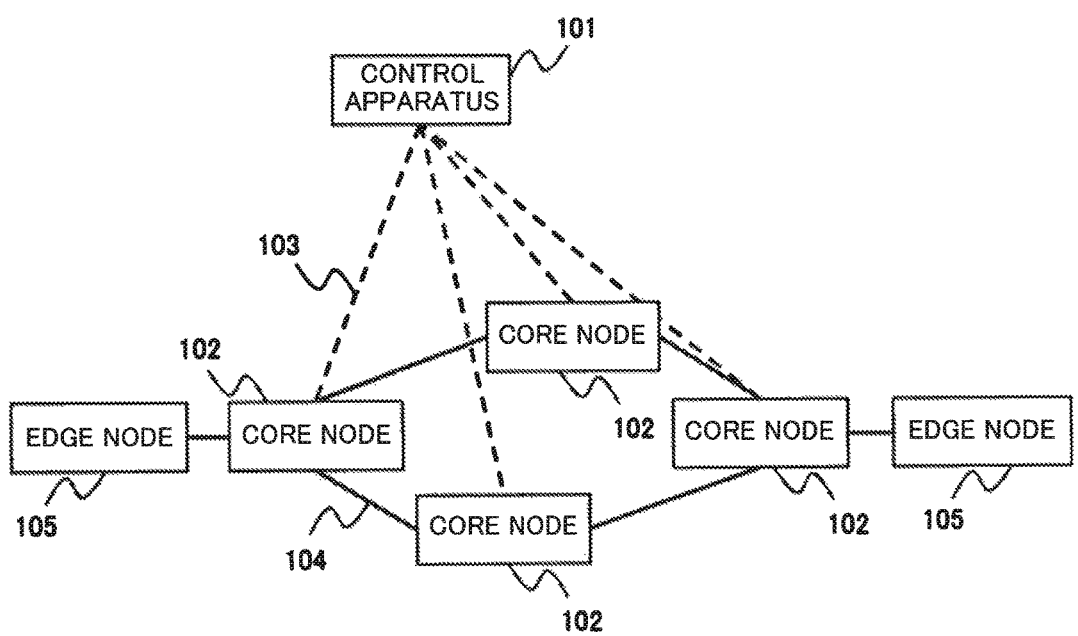
FIG. 18 is a diagram illustrating a conventional network configuration that uses OPENFLOW.
Figure 19:
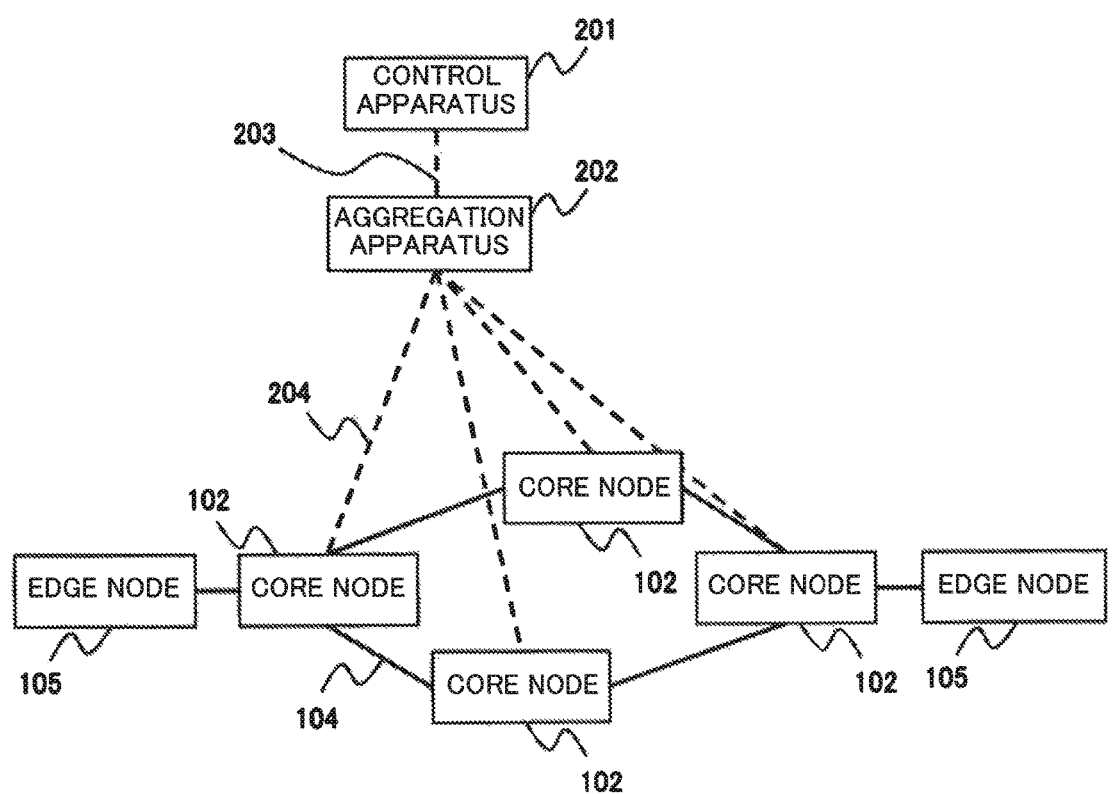
FIG. 19 is a diagram illustrating a configuration of a communication network aggregated using OPENFLOW.
Figure 20:
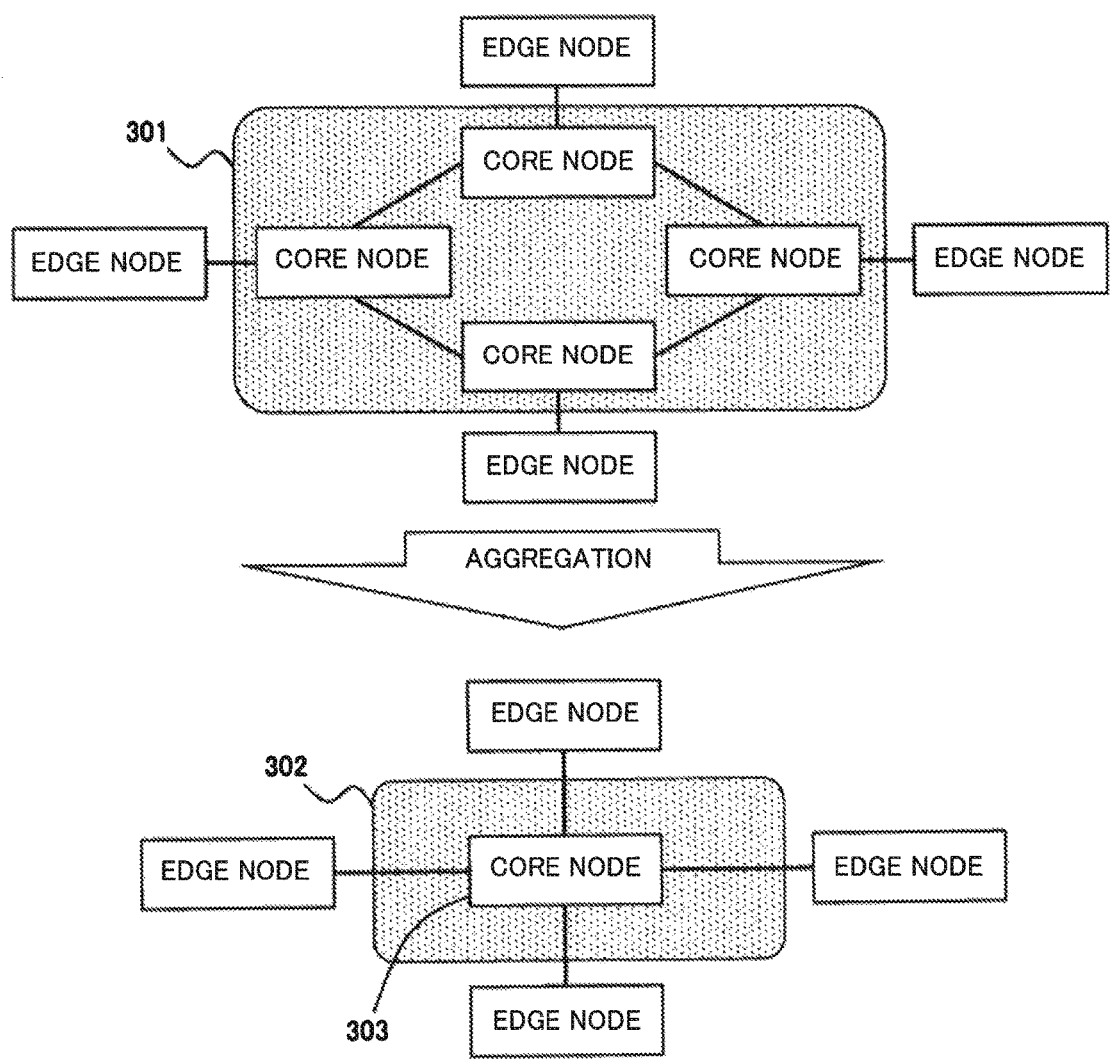
FIG. 20 is a diagram illustrating a concept of aggregation of a communication network.
Figure 21:
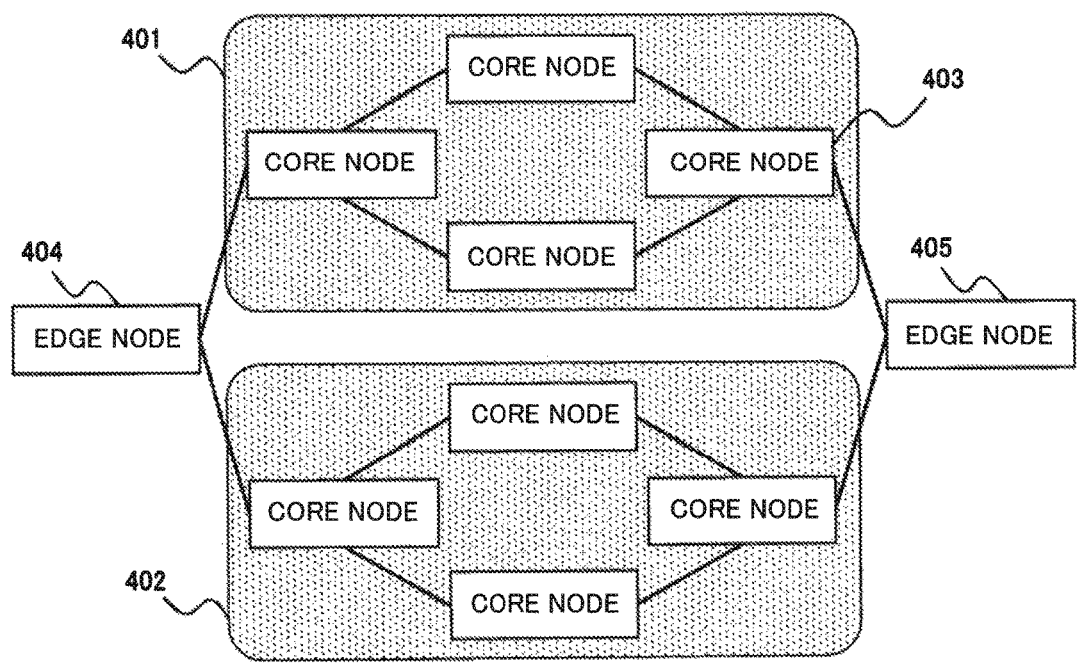
FIG. 21 is a diagram illustrating a configuration of a redundant communication network with two systems of active system and standby system.

FIG. 17 is a block diagram illustrating an overview of a communication system according to the present invention. The communication system according to the present invention includes: a core node 90 (for example, the core node 505) which processes received packets in accordance with a specified flow; and a communication control apparatus 80 (for example, the aggregation apparatus 502) which is connected between a control apparatus (for example, the control apparatus 501) controlling the core node 90 and the core node and controls each of the core nodes existing in an aggregated network into which one or more core nodes are aggregated.

Note that the configuration of the communication control apparatus 80 is the same as the configuration of the communication control apparatus 80 illustrated in FIG. 16. Even this configuration, the configuration enhances the reliability of a communication network while simplifying control over the communication devices in the communication network including a plurality of communication devices.

The whole or part of the example embodiments disclosed above can be described as, but not limited to, the following supplementary notes.

(Supplementary note 1) A computer readable non-transitory medium embodying a communication control program, the program causing a computer connected between a core node which processes received packets in accordance with a specified flow and a control apparatus which controls the core node, and controlling each of the core nodes existing in an aggregated network into which one or more the core nodes are aggregated to perform a method, the method comprising: converting a notification received from the core node in the aggregated network to a notification from the aggregated network and sends the converted notification to the control apparatus, and converting a notification which is directed to the aggregated network and received from the control apparatus to a notification to each of the core nodes in the aggregated network and sends the converted notification to the core node; updating information in a topology conversion information storage unit for the aggregated network as a unit, the topology conversion information storage unit storing, for each of the aggregated networks, connection relationships between the core nodes in the aggregated network, and information specifying a real port which is a port through which the core node in the aggregated network is connected to a device outside the aggregated network and specifying a real node which is the core node having the real port, and, based on the information stored in the topology conversion information storage unit, converting an aggregated flow specified for the aggregated network and received from the control apparatus to a real flow specified for each of the core nodes in the aggregated network.

(Supplementary note 2) The method according to supplementary note 1, wherein, based on a policy defining the aggregated network to be used depending on a detected event, updating the information stored in the topology conversion information storage unit with information indicating the aggregated network related to the detected event.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2014-145872, filed on Jul. 16, 2014, the disclosure of which is incorporated herein in its entirety by reference.

REFERENCE SINGS LIST

101, 201, 501 Control apparatus
102, 303, 403, 505, 903, 1001-1008 Core node
103, 203, 204 Secure channel 104 Communication link
105, 404, 405, 406, 506, 507, 901, 902 Edge node
202, 502 Aggregation apparatus
301, 302 Communication network
503, 504, 1801-1803 Aggregated network
601 Virtual switch
602 Topology conversion unit
603 Virtual controller
604 Real-topology table
605 Topology conversion table
606 Flow conversion table
607 Network configuration database
608 Policy determination unit
609 Policy database
610 Failure detection unit

What is claimed is:

1. A communication control apparatus connected between a core node which processes received packets in accordance with a specified flow and a control apparatus which controls the core node, the communication control apparatus controlling each of the core nodes existing in an aggregated network into which one or more the core nodes are aggregated, the communication control apparatus comprising:
a communication control unit which converts a notification received from the core node in the aggregated network to a notification from the aggregated network and sends the converted notification to the control apparatus, and converts a notification which is directed to the aggregated network and received from the control apparatus to a notification to each of the core nodes in the aggregated network and sends the converted notification to the core node;
a topology conversion information storage unit which stores, for each of the aggregated networks, connection relationships between the core nodes in the aggregated network, and information specifying a real port which is a port through which the core node in the aggregated network is connected to a device outside the aggregated network and specifying a real node which is the core node having the real port; and
a topology update unit which updates information stored in the topology conversion information storage unit for the aggregated network as a unit,
wherein,
the communication control unit, based on the information stored in the topology conversion information storage unit, converts an aggregated flow specified for the aggregated network and received from the control apparatus to a real flow specified for each of the core nodes in the aggregated network, and
the packets of data are communicated within the aggregated network in accordance with the real flow that has been specified for each of the core nodes, in a reliability-improved manner via conversion of the aggregated flow to the real flow specified for each of the core nodes.

2. The communication control apparatus according to claim 1, comprising:
a policy storage unit which stores a policy defining the aggregated network to be used depending on a detected event,
wherein,
the topology update unit, based on the policy, updates the information stored in the topology conversion information storage unit with information indicating the aggregated network related to the detected event.

3. The communication control apparatus according to claim 1, wherein
the communication control unit calculates a communication path based on connection relationships between the core nodes in the aggregated network and converts the aggregated flow to the real flow in accordance with the calculated communication path.

4. The communication control apparatus according to claim 1, comprising:
a flow conversion information storage unit which stores the aggregated flow and the real flow, which are converted mutually, in association with each other,
wherein
the communication control unit mutually converts the aggregated flow and the real flow based on the information stored in the flow conversion information storage unit.

5. The communication control apparatus according to claim 4, wherein
when the topology update unit updates the information stored in the topology conversion information storage unit, the topology update unit recalculates the real flow related to the aggregated flow and updates the real flow related to the aggregated flow stored in the flow conversion information storage unit.

6. A communication control method for controlling each of core nodes existing in an aggregated network into which one or more the core nodes are aggregated, the method comprising:
converting a notification received from the core node in the aggregated network to a notification from the aggregated network and sends the converted notification to a control apparatus, and converting a notification which is directed to the aggregated network and received from the control apparatus to a notification to each of the core nodes in the aggregated network and sends the converted notification to the core node;
updating information in a topology conversion information storage unit for the aggregated network as a unit, the topology conversion information storage unit storing, for each of the aggregated networks, connection relationships between the core nodes in the aggregated network, and information specifying a real port which is a port through which the core node in the aggregated network is connected to a device outside the aggregated network and specifying a real node which is the core node having the real port; and
based on the information stored in the topology conversion information storage unit, converting an aggregated flow specified for the aggregated network and received from the control apparatus to a real flow specified for each of the core nodes in the aggregated network,
wherein packets of data are communicated within the aggregated network in accordance with the real flow that has been specified for each of the core nodes, in a reliability-improved manner via conversion of the aggregated flow to the real flow specified for each of the core nodes.

7. The communication control method according to claim 6, wherein
based on a policy defining the aggregated network to be used depending on a detected event, updating the information stored in the topology conversion information storage unit with information indicating the aggregated network related to the detected event.

8. A computer readable non-transitory medium embodying a communication control program, the program causing a computer connected between a core node which processes received packets in accordance with a specified flow and a control apparatus which controls the core node, and controlling each of the core nodes existing in an aggregated network into which one or more the core nodes are aggregated to perform a method, the method comprising:

converting a notification received from the core node in the aggregated network to a notification from the aggregated network and sends the converted notification to the control apparatus, and converting a notification which is directed to the aggregated network and received from the control apparatus to a notification to each of the core nodes in the aggregated network and sends the converted notification to the core node; and updating information in a topology conversion information storage unit for the aggregated network as a unit, the topology conversion information storage unit storing, for each of the aggregated networks, connection relationships between the core nodes in the aggregated network, and information specifying a real port which is a port through which the core node in the aggregated network is connected to a device outside the aggregated network and specifying a real node which is the core node having the real port; and based on the information stored in the topology conversion information storage unit, converting an aggregated flow specified for the aggregated network and received from the control apparatus to a real flow specified for each of the core nodes in the aggregated network, wherein packets of data are communicated within the aggregated network in accordance with the real flow that has been specified for each of the core nodes, in a reliability-improved manner via conversion of the aggregated flow to the real flow specified for each of the core nodes.

* * * * *